United States Patent [19]
Pipes

[11] Patent Number: 4,958,440
[45] Date of Patent: Sep. 25, 1990

[54] STACKER ALIGNMENT DEVICE
[75] Inventor: George R. Pipes, Salt Lake City, Utah
[73] Assignee: Eaton Corporation, Cleveland, Ohio
[21] Appl. No.: 338,672
[22] Filed: Apr. 17, 1989
[51] Int. Cl.$^5$ ...................... G01B 5/255; G01D 21/00
[52] U.S. Cl. ................................. 33/645; 33/203.15; 33/651
[58] Field of Search ...................... 33/645, 651, 651.1, 33/203.15, 203.16, 203.17, 203.18, 203.19, 523, 523.1, 523.2, 613

[56] References Cited
U.S. PATENT DOCUMENTS
2,175,655 10/1939 Allen ................................. 33/651.1
2,633,643 4/1953 Thompson ............................. 33/651
3,177,590 4/1965 Smyrniotis ....................... 33/203.18
4,545,128 10/1985 Baker ................................. 33/203.18

OTHER PUBLICATIONS
Kwik-Ezee, Inc., 4/29/49, p. 1.

Primary Examiner—William A. Cuchlinski, Jr.
Assistant Examiner—Alvin Wirthlin
Attorney, Agent, or Firm—F. M. Sajovec

[57] ABSTRACT

A device for facilitating the field alignment of the drive and idler wheels of a rail supported S/R machine. Vertical alignment is determined by means of a spirit level at the end of a pivotally mounted bar which is initially set perpendicular to a surface of a base member in magnetic engagement with the side of the wheel, the degree of misalignment being indicated by a dial indicator in contact with the bar. Longitudinal misalignment is determined by a parallelogram assembly one side of which is parallel to the surface of the base member and which includes a pair of spaced apart pins, one stationary and one movable, which engage the rail under the influence of a biasing force applied to the parallelogram assembly. The extent and direction of movement of the movable pin indicates the extent and direction of longitudinal misalignment of the wheel as read by a dial indicator in contact with the movable pin. The invention also provdes a lead-in device for placing the alignment device in engagement with the wheel to be aligned.

14 Claims, 6 Drawing Sheets

STACKER ALIGNMENT DEVICE

The present invention relates to storage/retrieval machines, and more particularly to a method and apparatus for aligning the drive and idler wheels of a storage/retrieval machine after the machine is installed in a warehouse or the like.

Storage and retrieval (S/R) machines, particularly of the unit load type, are generally very large and are necessarily erected and aligned in the field. There are existing methods and apparatus for aligning the mast of such a machine relative to its base, for example as shown in U.S. Pat. No. 4,372,426 assigned to the assignee of this application. In addition to alignment of the mast, it is also necessary to align the drive and idler wheels of an S/R machine with respect to the track on which the machine rides in order to avoid such problems as erratic movement and premature wheel bearing wear. Generally, the design of S/R machines is such that the wheels are not readily accessible after the machine has been erected in its warehouse environment with the result that heretofore the alignment of the wheels has involved a time-consuming trial and error process which does not necessarily result in optimum alignment accuracy.

It is therefore an object of the present invention to provide a device which can be used to simply and accurately align the drive and idler wheels of a storage/retrieval machine after the machine has been field-erected.

It is a further object of the invention to provide such a device which is portable and which can be used in the field with minimum disassembly of components of the storage/retrieval machine.

To satisfy the above objectives, the present invention provides a portable gauge assembly which is held in engagement with a wheel to be aligned by means of a magnet and which is operable to determine the direction and degree of both vertical and longitudinal misalignment of a wheel. More specifically, the direction of vertical misalignment is determined by means of a spirit level at the end of a pivotally mounted, elongated rod which is initially set perpendicular to the magnet face (and thus to the wheel face). The degree of misalignment is indicated by a dial indicator in contact with the rod. In an illustrated embodiment of the invention, the dial indicator reading is used to determine the thickness of shims necessary to be placed between mounting elements of the wheel assembly to correct the misalignment. Longitudinal misalignment is determined by a portion of the gauge assembly in the form of a pair of spaced apart pins, one stationary and one movable which are initially calibrated to maintain a bar a predetermined distance away from and parallel to the rail on which the wheel rides. The extent and direction of movement of the movable rod when the rods are placed in contact with the rail indicates the extent and direction of longitudinal misalignment of the wheel as read by a dial indicator in contact with the end of the movable rod.

Other object and advantages of the invention will be apparent from the following description when considered in connection with the accompanying drawings, wherein.

Figure 1:
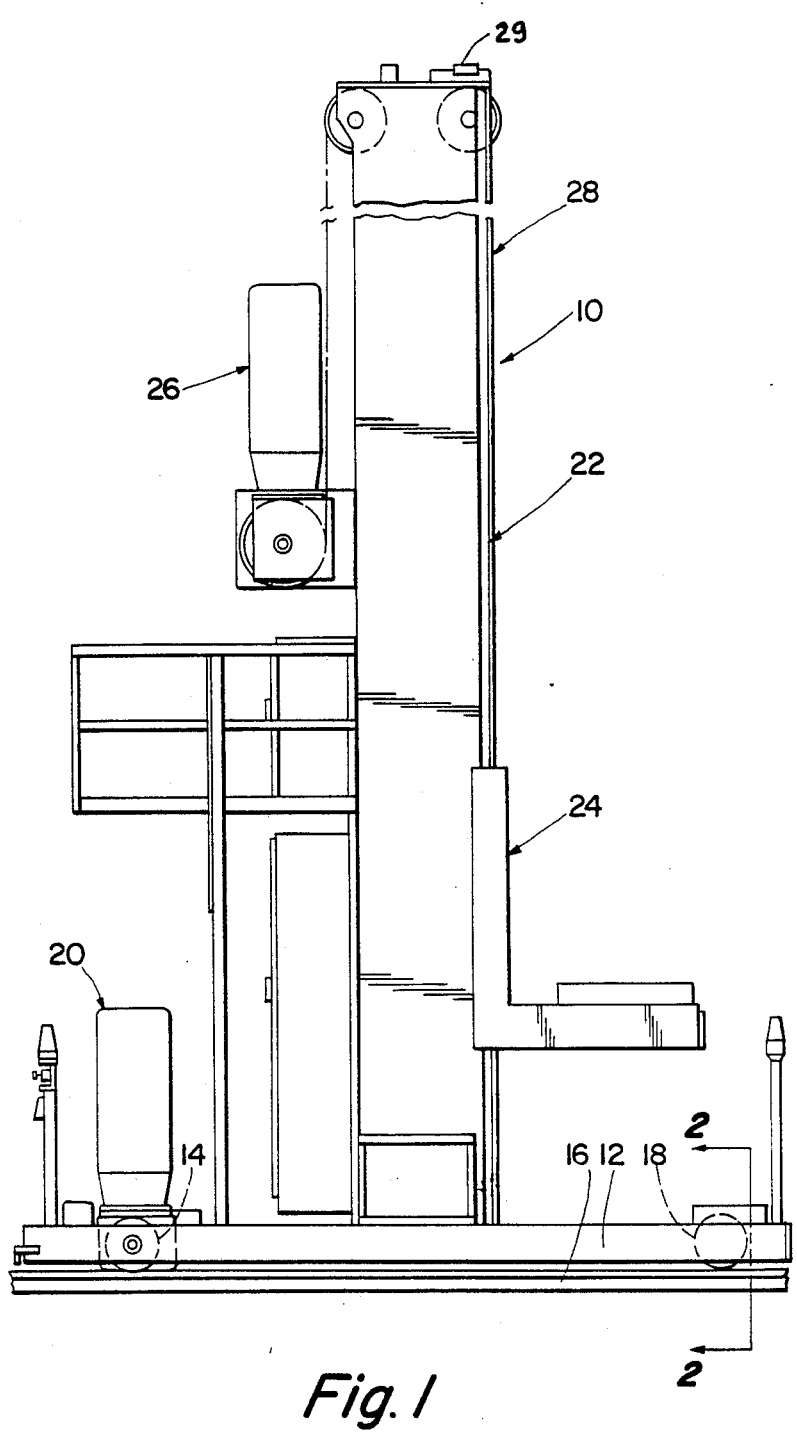
FIG. 1 is an elevation view of a typical storage and retrieval machine to which the invention is applied.

Referring to FIG. 1, there is illustrated a storage and retrieval or S/R machine 10 comprising a base frame 12, one or more drive wheels 14 mounted for rotation on the frame 12 and engageable with a floor mounted rail 16, one or more non-driven or idler wheels 18 mounted for rotation on the frame 12 and engageable with the rail 16, a drive motor assembly 20 mounted on the frame and operatively connected to the drive wheel to drive the S/R machine horizontally along the rail, a mast assembly 22 mounted to the frame 12, a load carriage assembly 24 attached to the mast assembly for vertical movement relative thereto, and a vertical drive motor assembly 26 attached to the mast assembly and operable to drive the load carriage up and down the mast by means of a cable or chain system 28. The vehicle is stabilized by means of an overhead rail (not shown) contacted by horizontal guide wheels 29.

Figure 2:
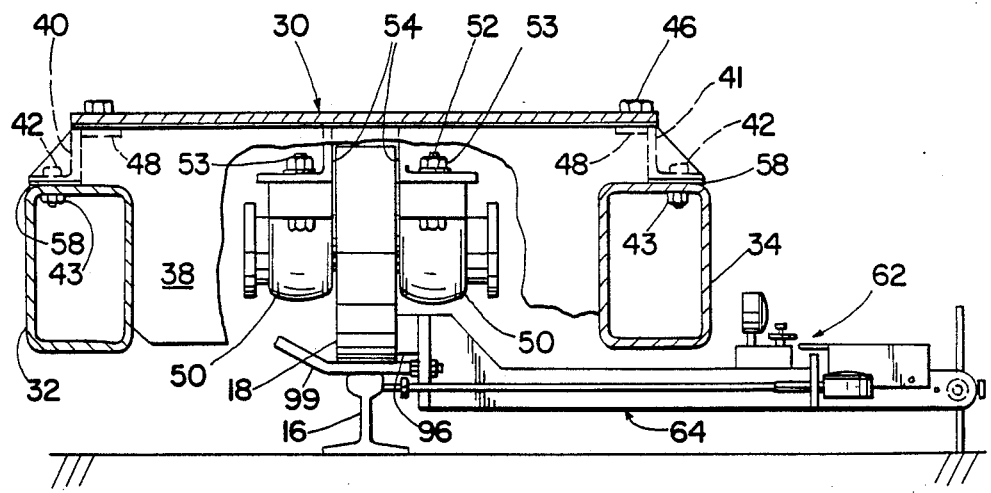
FIG. 2 is a section view taken along line 2—2 of FIG. 1 showing the invention in its operative position.
Figure 3:
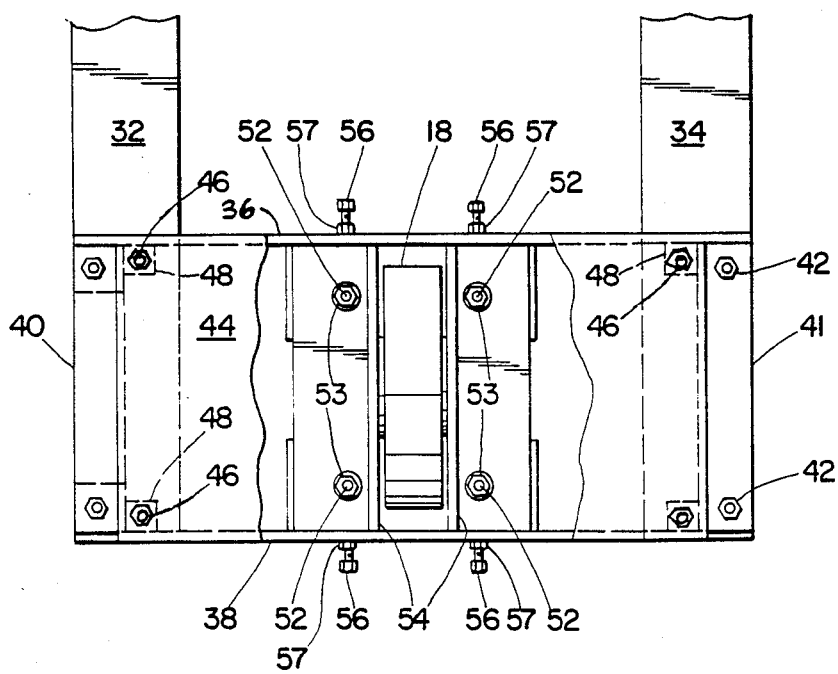
FIG. 3 is a partial plan view of the portion of the S/R machine shown in FIG. 2.

Referring particularly to FIGS. 2 and 3, the present invention will be described herein as applied to the idler wheel 18, it being understood, however, that the invention is also used in a similar manner in aligning the drive wheel 14. As illustrated herein, the idler wheel 18 is supported by a sub frame 30 attached to frame rails 32 and 34 which make up the frame 12. The sub frame comprises first and second vertical plates 36 and 38 spaced apart longitudinally along the frame to which are welded angle members 40 and 41 which are fastened to the frame rails by means of bolts 42 and nuts 43. A cover plate 44 is attached to the side plates by means of bolts 46 received through pads 48 welded to the side plates and angle members. The idler wheel 18 is supported by pillow blocks 50 attached by means of bolts 52 and nuts 53 to angle members 54 which are welded to the end plates. Jack screws 56 are threaded into nuts 57 welded to the end plates and bear against the ends of the pillow blocks. The clearance holes (not shown) in the angle members for the bolts 52 are somewhat oversize so that the pillow blocks are free to move relative to the angle members upon adjustment of the screws 56.

Figure 4:
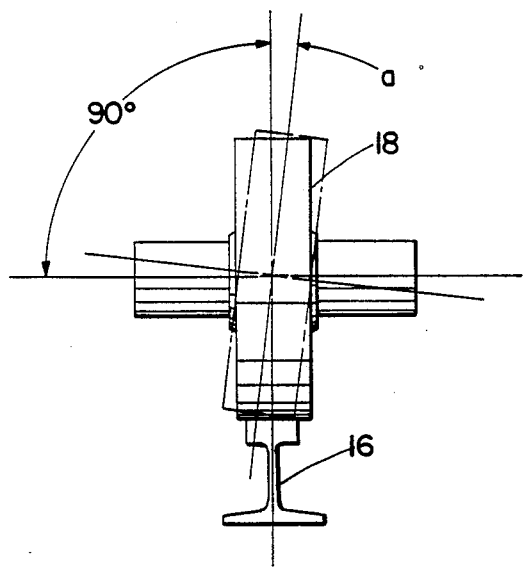
FIG. 4 is a schematic representation of a typical vertical misalignment condition.
Figure 5:
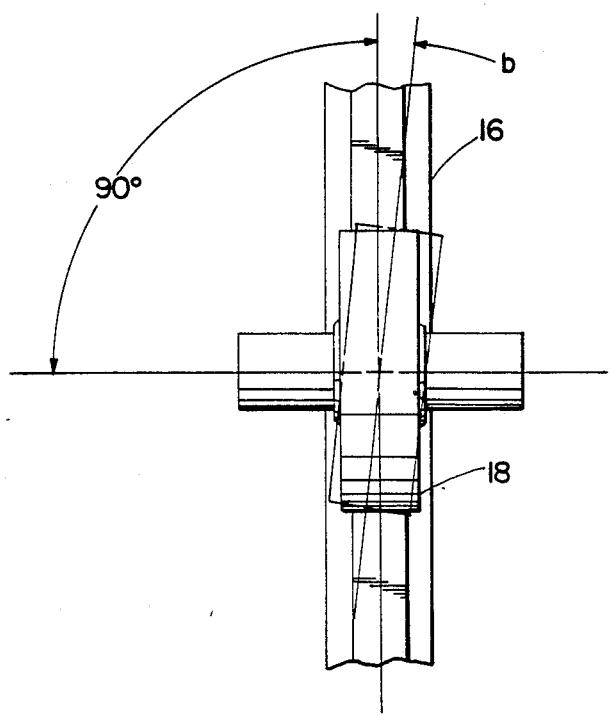
FIG. 5 is a schematic representation of a typical longitudinal misalignment condition.

The wheel alignment error modes are illustrated in FIGS. 4 and 5. In FIG. 4 the proper vertical alignment of a wheel 18 relative to the rail 16 is shown in full line, while vertical misalignment of the wheel at an angle "a" is shown in broken line. In FIG. 5 proper longitudinal alignment is illustrated in full line, while a longitudinal error at an angle "b" is in broken line.

Referring again to FIGS. 2 and 3, the longitudinal alignment is corrected by loosening the bolts and nuts 52 and 53 and selectively adjusting the screws 56 until the proper alignment is obtained. The vertical error is corrected by removing from or inserting shims 58 between the angle members 40 and 41 and the respective frame rails 32 and 34 to change the angular orientation of the sub frame 30 with respect to the frame rails. As discussed above, these adjustments are straightforward and simple in concept; however, in the field, it is very difficult to make the necessary error measurements.

The gauge 62, as illustrated in FIGS. 2 and 6 through 9, comprises an elongated frame assembly 64 on which is mounted a vertical gauge assembly designated generally by the reference numeral 66 and a longitudinal gauge assembly designated generally by the reference numeral 68.

The frame assembly comprises first and second side plates 69 and 70, spaced apart about a longitudinal centerline, an end plate 72 attached to and connecting the side plates at one end, and a spacer bar 74 attached to and connecting the side plates at the other end. A pair of corner blocks 75 and 76 are attached to the side plates by screws 77, and the end plate 72 is attached to the corner blocks by screws 78. An elongated sensor or first bar 80 is received between the side plates and is pivotally mounted on a pivot pin 82 received between the corner blocks 75 and 76. A spirit level 84 is attached to the sensor bar at the end opposite the pivot pin.

Figure 8:
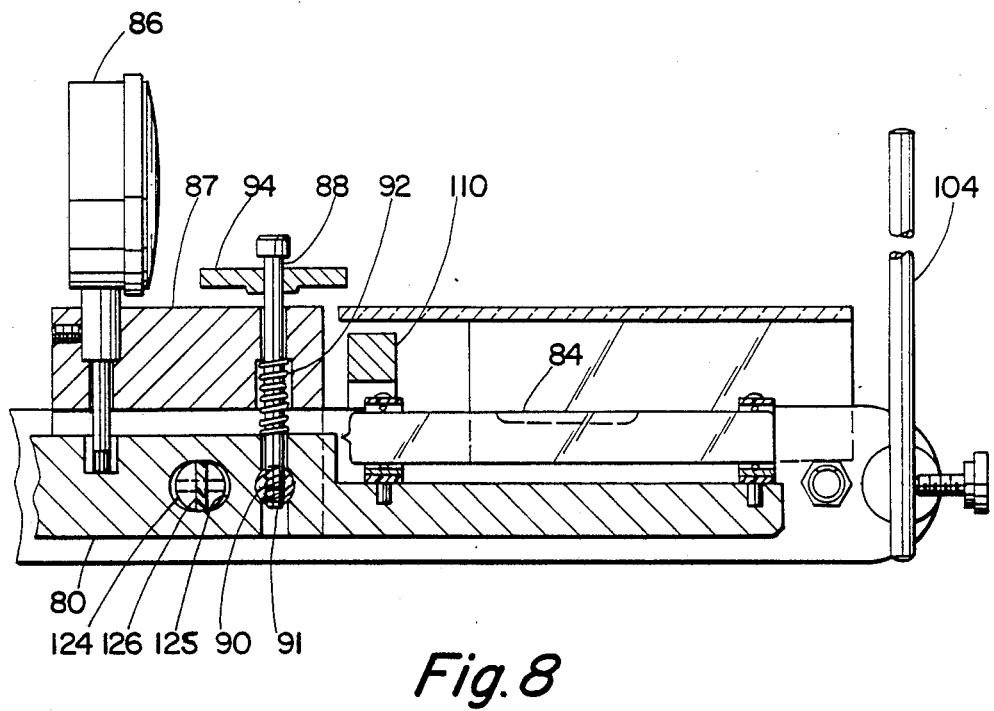
FIG. 8 is a fragmentary sectional view, with parts removed taken along line 8—8 of FIG. 7.

The sensor bar 80 functions to measure vertical misalignment as shown by a dial indicator 86 fixed to the frame assembly 64 and having its operating element bearing against the sensor bar. Referring to FIG. 8, in the preferred embodiment illustrated the dial indicator is mounted on a block 87 which is received between and attached to the side plates. An adjusting screw 88 is received through clearance holes formed through the block 87 and the sensor bar 80 and is threaded into a pivot shaft 90 received through the sensor bar perpendicular to the longitudinal axis of the bar. A set screw 91 is received in the pivot shaft to lock the adjusting screw in the shaft 90.

A spring 92 is received over the adjusting screw and within a counterbore formed in the block 87 and acts between the sensor bar and the block 87 to normally bias the free end of the bar downward as viewed in FIG. 8. An adjusting knob 94 is threaded onto the screw 88 whereby when the knob 94 is turned clockwise until it contacts the block 87, further rotating it will pull the screw 88 and thus the rod 80 upward against the force of the spring 92 as will be described in more detail below.

To properly place the gage assembly in position for measurement, a bar magnet 96 is bolted to the end plate 72 and is adapted to adhere to the side of the wheel 18 to be gauged. Since the wheels of a typical S/R machine are generally not easily accessible from outside the machine, it is necessary to provide some means whereby the gauge assembly can be positioned relative to the wheel and the rail 16 without actually being able to see the wheel. For this purpose two lead-in bars 98 and 99 are attached to the end plate 72 and are used to initially guide the gauge assembly into position. The bar 98 is a relatively short, straight rod with one end threaded into the end plate and locked in place by nuts 100. The other bar 99 is similarly attached to the end plate but is relatively long and is splayed outward and upward by about 40°.

Figure 6:
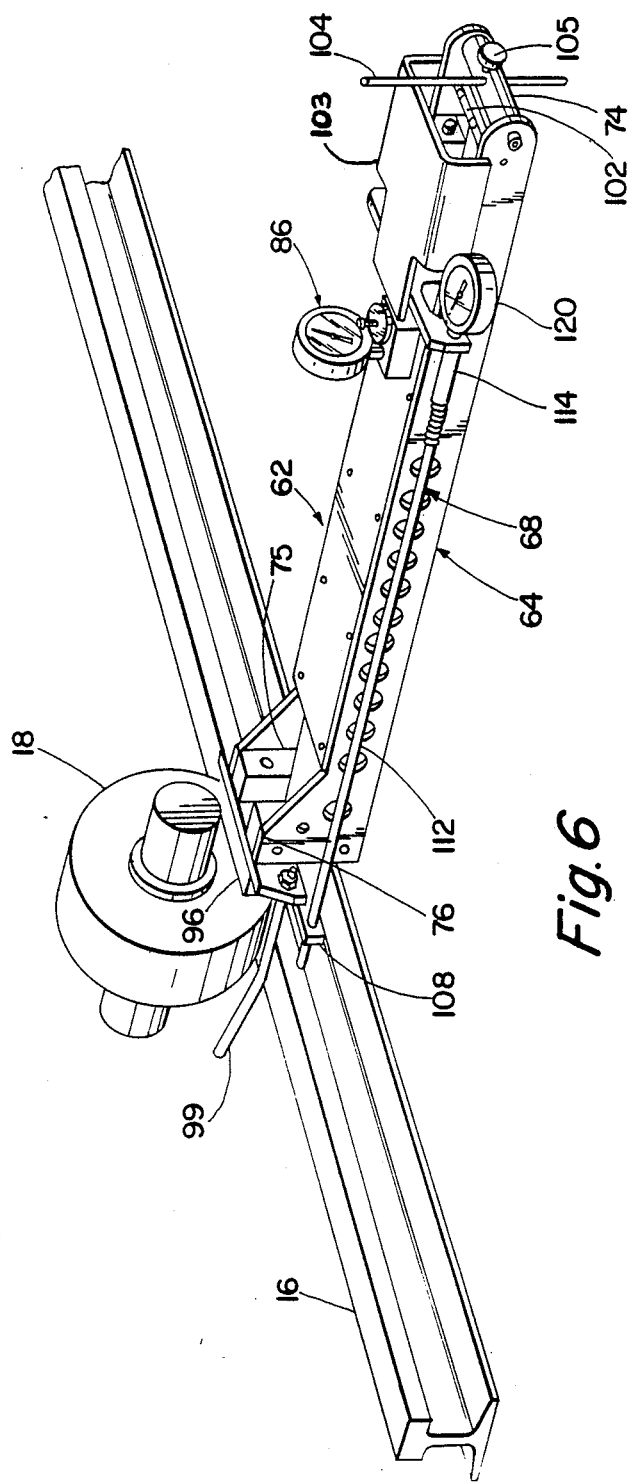
FIG. 6 is a perspective view of the invention in position adjacent a wheel of a storage and retrieval machine.

Referring particularly to FIG. 6, the gauge assembly is put in position for measurement by placing it on the floor approximately in line with the centerline of the wheel and then pushed inward. The angled lead-in bar 99 will "climb" the rail 16 to lift the magnet end of the gauge to the proper height with respect to the wheel while the straight sections of the lead-in bars will straddle the wheel and rest on the rail to approximately center the gauge with respect to the wheel prior to engagement of the magnet with the side of the wheel. A second spirit level 102 is mounted across the side plates to assist in setting the gauge so that the end plate is parallel to the rail. To maintain the gauge in position, a support rod 104 is received through the spacer bar 74 to support the free end of the gauge so that gauge remains parallel to the floor and the magnet remains in contact with the wheel. To hold the rod in position, a lock screw 105 is threaded into the spacer bar and bears against the rod. The vials are protected by a clear plastic cover 103 attached to the side plates.

The sensor bar 80 has two operating modes: a "calibrate/sensing" mode wherein the vertical gauge is initially aligned and the direction of vertical misalignment determined; and a "measure" mode wherein the amount of correction required to achieve a vertical alignment can be determined.

Figure 7:
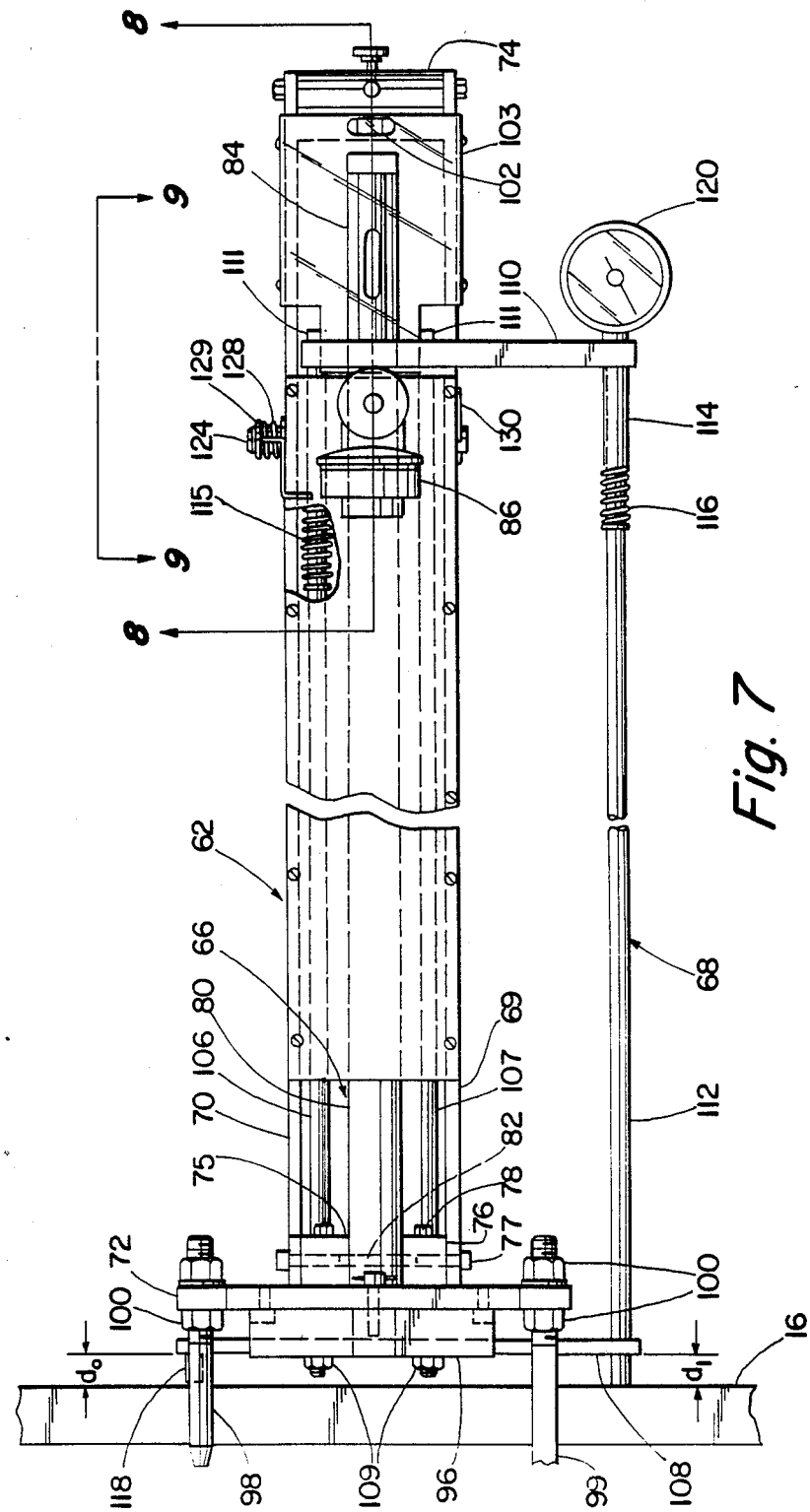
FIG. 7 is a plan view of the invention.

Referring particularly to FIGS. 7 and 8, a shaft 124 extends through the sensor bar 80 and through the side plates 69 and 70 and is received in bearing bores formed in the side plates. An elongated clearance hole 125 is formed in the sensor bar and the portion of the shaft 124 which spans the sensor bar is notched or cut away on opposite sides of its centerline to leave a rectangular blade portion 126 within the hole 125. Referring to FIG. 8, it can be seen that when the shaft 124 is rotated such that the blade portion is in the vertical position as shown in solid line, the sensor bar is prevented from moving up or down, and that when the shaft 124 is rotated 90° to put the blade portion in the broken line position of FIG. 8, the sensor bar is free to move. Referring to FIG. 7, a spring 128 is received over one end of the shaft 124 and acts between the side plate 70 and a retaining ring 129 received on the shaft. At the opposite end of shaft 124, a pin 130 is pressed into the shaft and is maintained in contact with the side plate 69 by the spring 128. To establish the "calibrate/sensing" and "measure" positions of the shaft 124, grooves (not shown) disposed 90° apart about the axis of the shaft are formed in the surface of the plate 69. The pin 130 is positioned in the shaft such that when it falls into one of the grooves, the blade portion 126 of the shaft will be in full line or "calibrate/sensing position.

When the pin falls into the other groove, the blade will be in the broken line or "measure" position.

The longitudinal gauging function is provided by a spring-loaded parallelogram assembly consisting of a pair of guide rods 106 and 107 received between and parallel to the side plates 69 and 70 and fastened to a transverse locator or second bar 108 positioned ahead of the end plate 72 and an indicator mounting bar or third bar 110 located behind the block 87 and extending transversely to the frame assembly.

The guide bars are received through bearing bores in the end plate 72 and the mounting block 87 and are threaded into the locator bar 108 and locked thereto by nuts 109. The opposite ends of the guide bars are attached to the indicator mounting bar by bolts 111 received through the indicator bar and threaded into the ends of the guide bars. Springs 115 are received over the guide bars and act between the mounting block 87 and shoulders formed on the bars to bias the parallelogram assembly to the left as shown in FIG. 7. A push rod 112 extends through a bushing in the locator bar 108 and into a bushing 114 fixed to the indicator mounting bar 110. A spring 116 is received over the push rod 112 and acts between the end of bushing 114 and a shoulder formed on the push rod to bias the push rod to the left in FIG. 7, i.e. toward the rail 16.

A locator pin 118 is fixed to the end of the locator bar 108 opposite the push rod and extends outward toward the rail. A second dial indicator 120 is mounted on the indicator mounting bar with its operating element extending into the bushing 114 and in contact with the end of the push rod 112.

Figure 9:
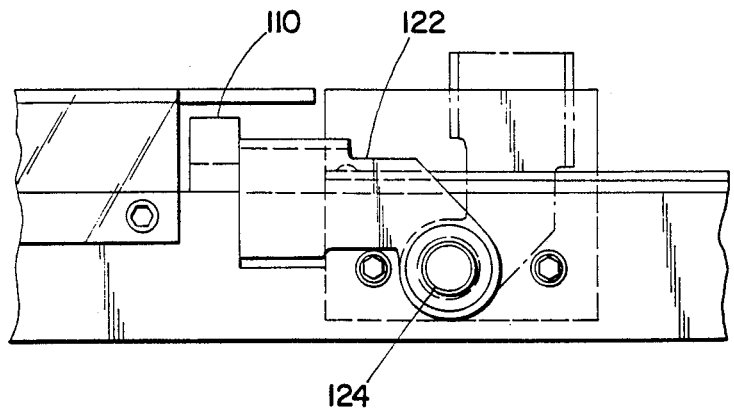
FIG. 9 is a fragmentary elevation view taken at line 9—9 of FIG. 7.

Referring to FIG. 9, when the longitudinal gauge is not in use, it is held in a retracted position by means of a lock lever 122 pivotally mounted on a shaft 124 and received between the spring 128 and the side plate 69. In its locked position shown in solid line in FIG. 9, the lock lever bears against the indicator mounting bar after it has been moved to the right in FIG. 7 (left in FIG. 9) against the force of springs 115.

VERTICAL WHEEL ADJUSTMENT

The vertical gauge assembly is constructed such that in the "calibrate/sensing" position shown in FIG. 8, the sensor bar is perpendicular to the face of the magnet 96, the level 84 is centered when the magnet is vertical, and the dial indicator 86 is set at zero.

To set the gauge up for vertical adjustment, the lock lever 122 is placed in its locked position against the mounting bar 110, the shaft 124 is rotated to put the pin 130 in the "calibrate/sensing" position, and the adjusting knob 94 is turned counterclockwise until it contacts the head of adjusting screw 88.

The gauge assembly is then placed on the floor next to the AS/RS vehicle approximately in line with the centerline of a wheel and pushed forward allowing the lead-in bars 98 and 99 to move the front of the gauge upward until the magnet 96 engages the wheel. The gauge is then tilted about its longitudinal axis as necessary to level it as determined by the cross level 102 and the support rod lowered until it contacts the floor after which it is locked in that position by means of the screw 105. This establishes the existing vertical angular position of the wheel 18 as indicated by the level 84. If the bubble is toward the stacker vehicle, or to the left as viewed in FIG. 7, the wheel is out of vertical alignment in the direction of angle b in FIG. 5, and referring to FIGS. 2 and 3, shims 58 must be added between the angle member 41 and the frame rail 34 on the gauge side of the vehicle. If the bubble is away from the stacker vehicle, or to the right as viewed in FIG. 7, shims 58 must be added between the angle member 40 and the frame rail 32 on the opposite side of the vehicle.

To determine the amount of correction required, i.e., the thickness of the shims which must be added, the starting or "0" position of the dial indicator 86 is noted (FIG. 8), the shaft 124 is put in its "measure" position which will cause the rod 80 to be moved to its extreme downward position by the spring 92 and the adjusting screw 88 is rotated clockwise past the point where it contacts the block 87 to pivot the sensor bar 80 about pin 82 until the bubble in level 84 is centered indicating that the sensor bar is in a true horizontal position. The movement of the dial indicator 86 as the sensor bar attains a level position will be proportional to the degree of vertical misalignment of the wheel 18 and thus can be used to determine the thickness of the shims 58 required to correct the misalignment. In the illustrated embodiment, the gauge is constructed such that the change in the dial indicator reading multiplied by two yields the shim thickness required for correction.

LONGITUDINAL WHEEL ADJUSTMENT

The longitudinal gauge assembly is initially calibrated by positioning the gauge assembly against a magnetic vertical surface, moving the lock lever 122 to its unlocked position (broken line position of FIG. 9) allowing the locator pin 118 and the push rod 112 to contact the surface, and setting the dial indicator 120 to zero.

After the gauge assembly is in place against the wheel 18, the gauge leveled transversely by means of the level 102 and the support rod 104 positioned, the gauge is put into position for longitudinal adjustment by moving the lock lever 122 to the broken line position of FIG. 9 allowing the longitudinal gauge assembly 68 to move toward the stacker vehicle, i.e. to the left as viewed in FIG. 7, until the locator pin 118 which is fixed to locator bar 108, contacts the side of rail 16. The locator bar 108 and the indicator mounting bar 110 will remain parallel to the side of the wheel by virtue of the parallelogram arrangement of the guide rods 106 and 107 fixed to the bars 108 and 110. The push rod 112 is free to move through the locator bar 108 such that the amount of movement of the push rod from its zero position will provide an indication of the amount by which the distance "$d_1$" between the locator bar 108 and the rail at the push rod end of the locator bar, differs from the distance "$d_o$" at the locator pin end of the locator bar, as read on the dial indicator 120.

Referring to FIGS. 2 and 3, to make the necessary alignment corrections, the pillow block mounting bolts 52 are first loosened to permit movement of the pillow blocks. The pillow block jack screws 56 are then adjusted as necessary to change the angle of the wheel with respect to the sub frame 13, and thus the angle of the gauge assembly with respect to the track until the dial indicator 120 returns to its zero position.

When the dial indicator is zeroed, distance "$d_1$" will equal distance "$d_o$" and the wheel will be in the aligned, or solid line position, of FIG. 4. After the alignment is completed, the bolts 52 are retightened and locked and the jackscrews 56 are locked in position.

I claim:

1. Apparatus for determining the alignment of a wheel or a rail-supported vehicle with respect to the rail comprising a base member, means for maintaining a surface of said base member in contact with a surface of said wheel perpendicular to its axis of rotation, an elongated first bar mounted at one end to said base member for pivotal movement about an axis parallel to said surface of said base member, means for selectively fixing said first bar relative to said base member in a position perpendicular to said surface of said base member, means fixed to the opposite end of said first bar operable to indicate the angular orientation of said first bar relative to horizontal when said surface of said base member is in contact with said wheel and said first bar is in said fixed position, and first and second guide rods extending outward from said base member in position to straddle said wheel, at least one of said guide rods curving upward and outward such that contact of the rod with the rail causes the apparatus to move upward in relation to the rail when the apparatus is moved toward the rail.

2. Apparatus as claimed in claim 1, including an elongated frame attached to said base member and oriented substantially parallel to said first bar, and means acting between said elongated frame and said first bar for indicating the degree to which the angular position of said first bar deviates from horizontal when said base member is in contact with said wheel.

3. Apparatus as claimed in claim 2, including means acting between said elongated frame and said first bar for moving said first bar about its pivot axis.

4. Apparatus as claimed in claim 1, including an elongated frame attached to said base member and extending substantially parallel to said first bar, means mounted on said frame and engageable with said first bar for selectively putting said first bar in a first mode in fixed position perpendicular to said surface of said base member and in a second mode wherein said first bar is free to pivot about its pivot axis, and level indicating means mounted on said first bar and operable to indicate the orientation of said first bar in relation to horizontal.

5. Apparatus as claimed in claim 4, including first measurement means mounted on said frame and operable to measure the movement of said first bar about its pivot axis relative to a reference point.

6. Apparatus as claimed in claim 5, in which said first measurement means comprises means operable to measure the vertical distance traveled by a point on said first bar.

7. Apparatus as claimed in claim 6, in which said vertical distance measurement means comprises a dial indicator mounted on said frame with its movable indicating member engageable by said first bar.

8. Apparatus as claimed in claim 2, including a second bar disposed with its longitudinal axis parallel to said base member and mounted on said frame for linear movement toward and away from said base member in a direction perpendicular to said surface of said base member, means biasing said second bar away from said base member, and second measurement means measuring the degree to which said second bar deviates from a position parallel to the rail on which said vehicle is supported when said surface of base member is in contact with said wheel and said second bar is stopped by contact with the rail.

9. Apparatus as claimed in claim 8 including a locator pin extending a fixed distance from a first end of said second bar, a push rod mounted at the opposite end of said second bar for movement relative to said second bar in a direction parallel to the line of movement of said second bar, and means biasing said push rod away from said second bar, said second measurement means comprising means for indicating the difference between the fixed distance which said locator pin extends from said second bar and the distance which said push rod extends from said second bar when said locator pin and push rod are in contact with said rail and said surface of said base member is in contact with said wheel.

10. Apparatus as claimed in claim 9, in which said second measurement means comprises linear distance measuring means operatively engageable with said push rod.

11. Apparatus as claimed in claim 10, in which said linear distance measuring means comprises a dial indicator mounted in fixed position relative to said second bar and having its moveable indicating member engageable with said push rod.

12. Apparatus as claimed in claim 4, including a parallelogram assembly comprising a second bar disposed parallel to said surface of said base member, first and second rods perpendicular to said second bar and having one end fixed thereto, a third bar spaced from said second bar and fixed to the other end of said first and second rods; means mounting said parallelogram assembly on said frame for movement relative to said frame in a direction perpendicular to said surface of said base member; means acting between said frame and said parallelogram assembly biasing said parallelogram assembly away from said base member, a locator pin on one end of said second bar extending a predetermined distance from said second bar and engageable with the rail on which said vehicle is supported; a push rod extending through the opposite end of said second bar; means biasing said push rod outwardly of said second bar in a direction parallel to the line of movement of said parallelogram assembly; and second measurement means operable to measure the extension of said push rod relative to said second bar when said locator pin and said push rod are in contact with the rail.

13. Apparatus as claimed in claim 12, in which said second measurement means comprises a dial indicator mounted on said third bar, the movable indicating member of said dial indicator being engageable with an end of said push rod.

14. Apparatus as described in any one of claims 1 through 13, wherein said means for maintaining said base member in contact with the wheel comprises a magnet attached to the base member.

* * * * *